(12) United States Patent
Cha

(10) Patent No.: US 6,208,509 B1
(45) Date of Patent: Mar. 27, 2001

(54) PORTABLE COMPUTER HAVING ACCESS DOOR

(75) Inventor: Jung-Woo Cha, Kyunggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/453,570

(22) Filed: Dec. 2, 1999

(30) Foreign Application Priority Data

Dec. 2, 1998 (KR) .................................................. 98-23881

(51) Int. Cl.⁷ ...................................................... H05K 5/00
(52) U.S. Cl. .......................... 361/686; 361/687; 361/725; 360/97.01; 312/332.1
(58) Field of Search .................................. 361/686, 683, 361/687, 724–727; 360/97.01, 98.01; 312/332.1, 333

(56) References Cited

U.S. PATENT DOCUMENTS

| | | | |
|---|---|---|---|
| 5,162,976 | 11/1992 | Moore et al. ......................... | 361/393 |
| 5,224,869 | 7/1993 | Lee ....................................... | 439/136 |
| 5,313,596 | 5/1994 | Swindler et al. ..................... | 361/725 |
| 5,323,291 | 6/1994 | Boyle et al. .......................... | 361/683 |
| 5,424,913 | 6/1995 | Swindler ............................... | 361/687 |
| 5,619,397 | 4/1997 | Honda et al. ......................... | 361/686 |
| 5,627,974 | 5/1997 | Watts, Jr. et al. .................... | 361/683 |
| 5,724,226 | 3/1998 | Ruch et al. ........................... | 361/683 |
| 5,818,691 | 10/1998 | McMahan et al. .................. | 361/686 |
| 5,822,185 | 10/1998 | Cavallo ................................ | 361/686 |
| 5,838,539 | 11/1998 | Doss et al. ........................... | 361/686 |
| 5,864,708 | 1/1999 | Croft et al. .......................... | 395/821 |
| 5,966,285 | 10/1999 | Sellers ................................. | 361/686 |
| 5,969,940 | * 10/1999 | Sano et al. ........................... | 361/687 |
| 5,991,838 | 11/1999 | Swindler et al. .................... | 361/683 |
| 6,115,248 | * 9/2000 | Canova et al. ....................... | 361/686 |

* cited by examiner

Primary Examiner—Leo P. Picard
Assistant Examiner—Hung Van Duong
(74) Attorney, Agent, or Firm—Robert E. Bushnell, Esq.

(57) ABSTRACT

The present invention relates to a portable computer having an access door. The portable computer has a housing having a surface with an opening. At least one slot is formed on the surface having the opening. A door is coupled to the housing from the outside and the housing has at least one pin inserted into the housing through a slot. A washer is coupled to the pin. The washer is combined with a pin within the housing to enable the door to be moved horizontally along the slot. A spring is mounted on the surface corresponding to the slot. The spring provides the door with an elastic force when the door is moved horizontally along the slots.

16 Claims, 9 Drawing Sheets

PORTABLE COMPUTER HAVING ACCESS DOOR

CLAIM OF PRIORITY

This application makes reference to, incorporates the same herein, and claims all benefits accruing under 35 U.S.C. §119 from an application entitled Portable Computer Having Access Door earlier filed in the Korean Industrial Property Office on Dec. 2, 1998, and there duly assigned Ser. No. 98-23881 by that Office.

FIELD OF THE INVENTION

The present invention relates to a portable electronic device and, more particularly to a portable computer having an access door.

BACKGROUND OF THE INVENTION

Beginning in the mid-1980's, portable computers, alternatively known as either laptops or notebook computers, have expanded in popularity and at an astonishing rate. Such computers are lightweight and have a display screen supported by a hinged cover that protects the keyboard and display screen when the computer is not being operated.

A conventional portable computer includes a main body (or base) incorporating a keyboard assembly and a printed circuit board. The printed circuit board is mounted on the bottom housing of the main body. The display panel is provided with the display screen such as a LCD (Liquid Crystal Display) and is attached pivotally to the main body via a hinge portion. The hinge portion is disposed at the rear edge of the main body.

Small, hand-held, battery-operated personal computers have become well known in a variety of applications, particularly in the area of palmtop-type computers also commonly termed personal digital assistants (PDA).

These portable personal computers may interact with a variety of portable and stationary peripheral input/output devices such as printers, light pens, image scanners, video scanners, etc. Moreover, these computers may have an electrical power cord for receiving power from a standard electrical outlet, as well as a battery pack for powering the unit when an electrical outlet is unavailable or is inconvenient.

The portable computer also has the difficulty of mounting multi-media application devices such as a CD-ROM (Read Only Memory Compact Disc) or a DVD (Digital Versatile Disc) due to the restricted size and lightweight. Coupling the portable computer with a docking station solves these problems. The docking station structure is used to operatively connect the portable computer to peripheral devices and a power source. The docking station has an internal receiving chamber into which the portable computer may be manually inserted. Generally, to use the docking station, the user must insert the portable computer into the docking station. But, coupling the portable computer to the docking station is not easy because the user at first lifts the whole portable computer up then inserts the portable computer into a narrow entrance of the docking station. Therefore, there is a need of having a coupling manner without inserting the whole portable computer to the docking station. An easy way to load the whole portable computer on the docking station is needed.

An exemplar of prior art, Doss et al. (U.S. Pat. No. 5,838,539, Docking Module For Portable Computer, Nov. 17, 1998) discloses a docking module for portable computers. Cavello (U.S. Pat. No. 5,822,185, Ergonomic Docking Station For A Portable Computer, Oct. 13, 1998) discloses an ergonomic docking station for a portable computer. Croft et al. (U.S. Pat. No. 5,864,708, Docking Station For Docking A Portable Computer With A Wireless Interface, Jan. 26, 1999) discloses a docking station for docking a portable computer with a wireless interface. Ruch et al. (U.S. Pat. No. 5,724,226, Housing Access Door Constriction for A Portable Computer, Mar. 3, 1998) discloses a housing access door construction for a portable computer docking station. Watts, Jr. et al. (U.S. Pat. No. 6,27,974, Computer Docking System with Means for Allowing A Microprocessor in A Docking Station to Talk to A Central Processing Unit in A Docked Portable Computer, May 6, 1997) discloses a computer docking system with means for allowing a microprocessor in a docking station to talk to a central processing unit in a docked portable computer. Swindler (U.S. Pat. No. 5,424,913, Heat Sink/component Access Door for Portable Computers, Jun. 13, 1995) disclosed a heat sink/component access door for portable computers. Boyle et al. (U.S. Pat. No. 5,323,291, Portable Computer and Docking Station Having An Electromechanical Docking/undocking Mechanism and A Plurality of Cooperatively Interacting Failsafe Mechanisms, Jun. 21, 1994) discloses a portable computer and docking station having an electromechanical docking/undocking mechanism and a plurality of cooperatively interacting failsafe mechanisms. Swindler et al. (U.S. Pat. No. 5,313,596, Motorized Portable Computer/expansion Chassis Docking System, May 17, 1994) discloses a motorized portable computer/expansion chassis docking system. Lee (U.S. Pat. No. 5,224,869, Slidable Door Apparatus for Covering A Socket of A Computer, Jul. 6, 1993) discloses a slidable door apparatus for covering a socket of a computer.

Swindler et al. (U.S. Pat. No. , 5,991,838, Motorized Portable Computer/Expansion Chassis Docking System, November 1999) discloses a portable computer that is connected to a docking station by inserting the computer inside a chamber withing the docking station. Moore et al. (U.S. Pat. No. 5,162,976, Double Housing Wall Security Locking Apparatus for A Computer, November 1992) discloses a removable metal access wall portion. Sellers (U.S. Pat. No. 5,966,285, Mobile Portable Computer Docking/Office Station, October 1999) discloses a portable computer that slides on a top area of a docking station. The interface of the computer and docking station are both viewable on the outside surfaces. McMahan, et al. (U.S. Pat. No. 5,818,691, Portable Computer Docking System with Push to Engage and Push to Disengage Connection Module, October 1998) discloses a system that has a connector that couples the portable computer with the docking station. By pushing the computer, into the docking station, the connection occurs while pressing again allows a spring providing the force to disengage the computer interface with that of the docking station. Honda, et al. (U.S. Pat. No. 5,619,397, Electronic Device System Including A Portable Electronic Device Having A Handwriting Imput Device Locked to An Expansion Station When the Power Switch of the Portable Device is Turned on, April 1997) discloses a portable computer with an expansion station (docking station).

SUMMARY OF THE INVENTION

It is therefore an object of the present invention to provide a portable computer having an access door capable of easily coupling to a docking station.

It is also an object to have a way of docking a portable computer and protecting the docking interface on the portable computer.

It is another object to have an access door allowing for docking of a portable computer while reducing the chance of accidentally opening the access door.

It is a further object to have an access door for docking on a portable computer that will fully open when docking is needed and fully closed when there is no docking. This makes it quicker for a user to dock and undock without having to worry about whether the access door is fully open. If the access door is not fully open when docking, the docking interface could be damaged.

Another object is to assemble an access door for docking that does not require any fastening means such as a screw. Not using a screw is important for speeding up manufacture and having less chances of damaging the housing by over tightening a screw.

In order to attain the above objects, according to an aspect of the present invention, a portable computer has a housing having a surface. An opening formed on the surface of the housing with at least one slot formed on the surface having the opening. A door is coupled to the housing by attaching to the housing from the outside. At least one pin is inserted into the housing through a slot. A washer is combined with the pin within the housing to enable the door to be moved horizontally along the slot. An elastic member is mounted on the surface. The elastic member provides the door with a force when the door is moved horizontally along the slot.

The elastic member includes a spring connected with at least one pin. The spring has a first and a second plane member formed parallel with the sliding direction of the door, and also has a bending member disposed between the first and the second plane member. The pin is always compelled to be located at the first plane member or the second plane member by the pushing force of the bending member, so that the state of the door is always open or closed.

Furthermore, the elastic member further includes a plurality of ribs formed on the surface of the housing to be extended outwardly. The ribs are disposed at the end portion of the slot and has at least one hole. The coupling members are formed at the end portion of the first and the second plane member. The coupling members have an extending member to be inserted into the holes of the ribs.

The washer includes a projection connected with the surface of the housing. The projection has a smaller diameter than that of the washer. The projection decreases the friction between the surface of the housing and the washer because of the reduction of the connecting surface when the door is moved horizontally along the slot.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1A:
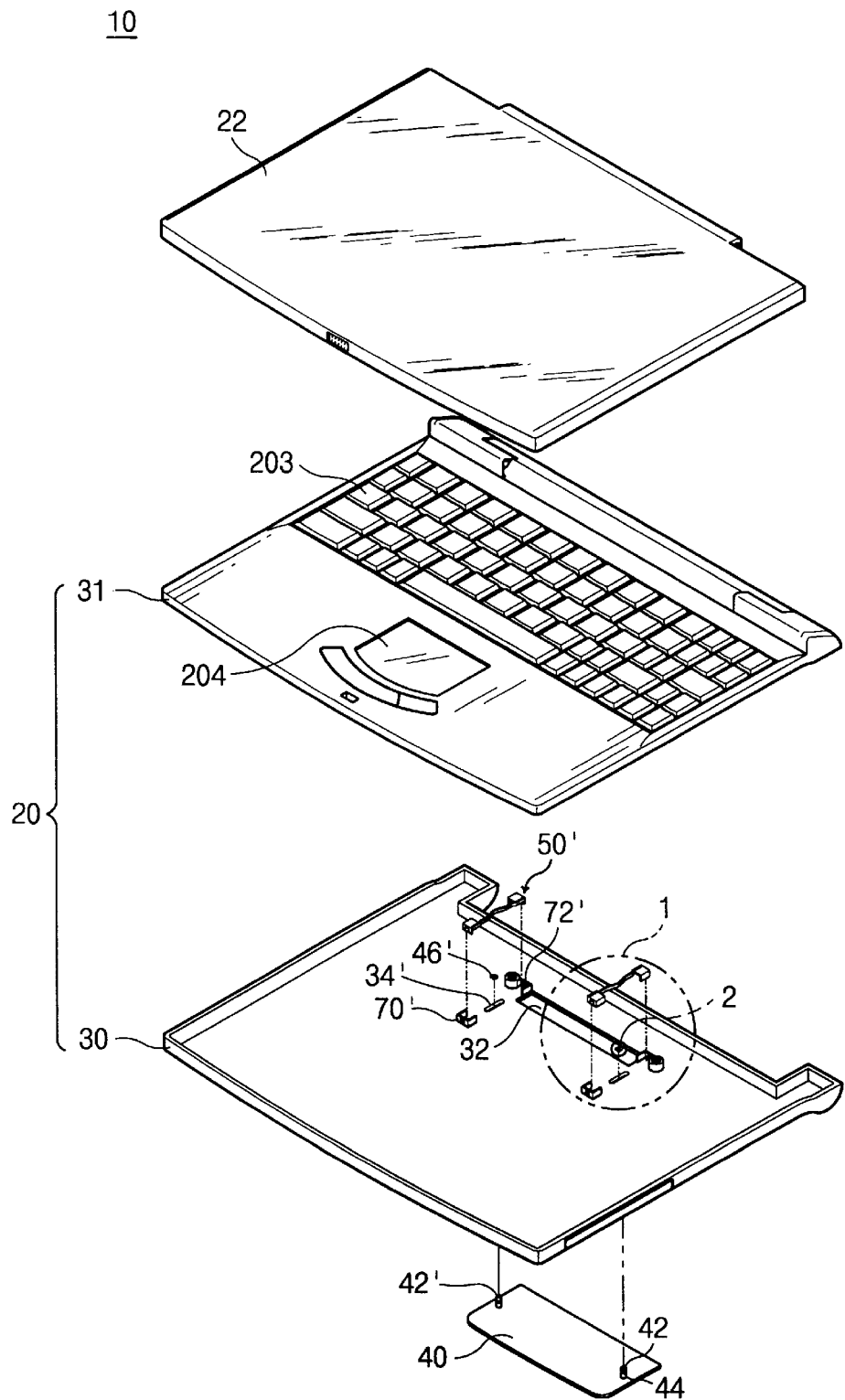
FIGS. 1A–1C together form an exploded perspective view for illustrating a portable computer according to the present invention.
Figure 1B:
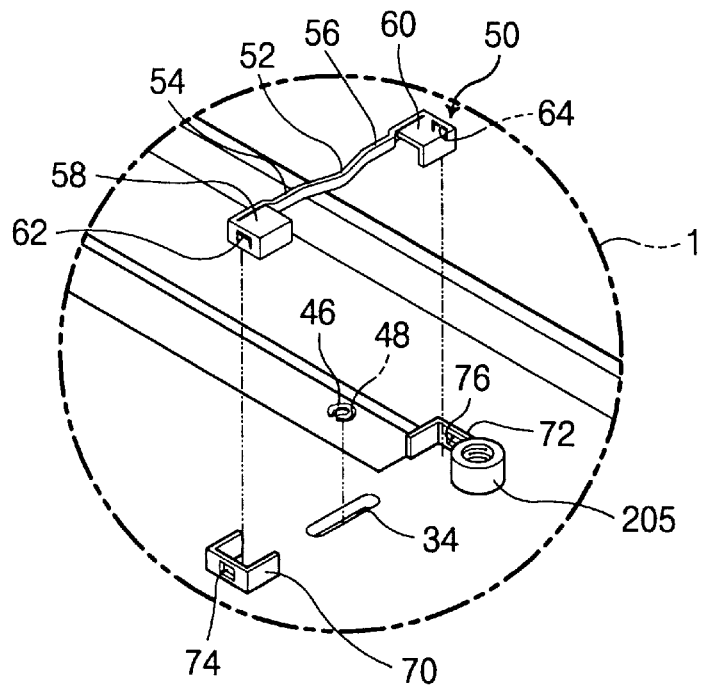
Figure 1C:
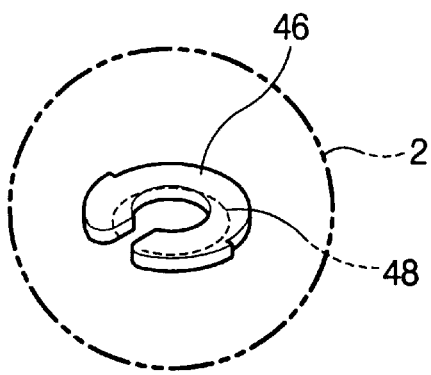
Figure 2:
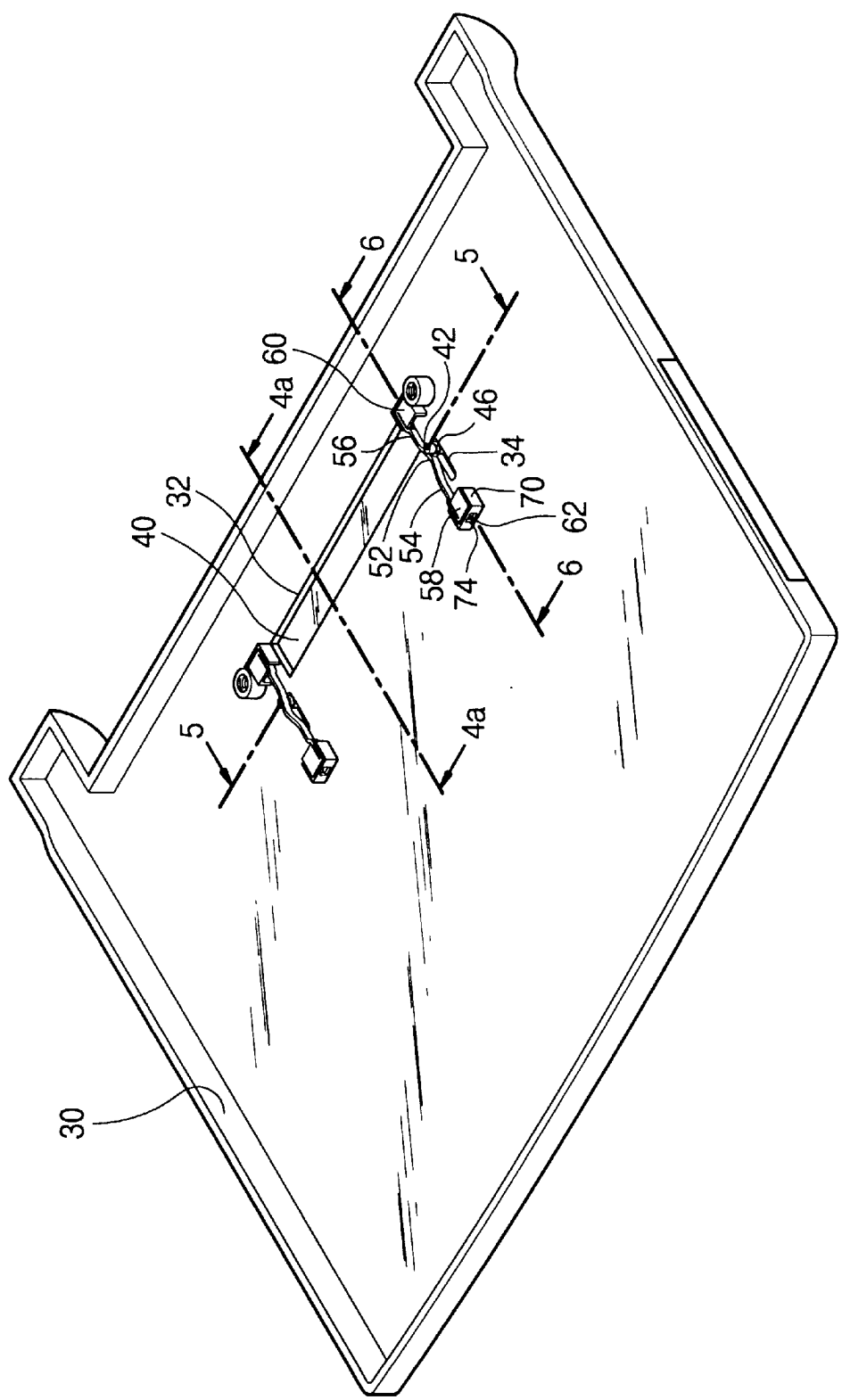
FIG. 2 is a perspective view for illustrating a lower housing provided with a door.

The following detailed description is of the best modes presently contemplated by the inventors for practicing the invention. It should be understood that the description of these preferred embodiments is merely illustrative and that they should not be taken in a limiting sense.

Referring to FIGS. 1A–4, the portable computer 10 according to the present invention includes a main housing (base) 20, a display panel 22 and an access door 40. The main housing 20 includes an upper (top) housing 31 and a lower (bottom) housing 30. The upper housing 31 has a keyboard 203 and a pointing device 204. An internal space is formed by the coupling of the upper housing 31 and the lower housing 30. In the internal space, the main board and other electronic elements are disposed. The main board (circuit board) may have a microprocessor for controlling the functions of the computer. The other electronic elements includes a power supply unit such as a battery, storage units such as a hard disk and a floppy disk. The display panel 22 incorporating a display screen such as an LCD (Liquid Crystal Display) is pivotally attached to the rear edge of the upper housing 31. At the rear edge of the upper housing 31, a hinge unit is formed. The hinge unit enables the display panel 22 to be moved pivotally.

The main housing 20 includes a lower housing 30 and an upper housing 31. An opening 32 is formed on a bottom surface of the lower housing 30. A connector 200 is provided with the portable computer to be coupled to the docking station 100 above the opening 32. A pair of slots 34, 34' are also formed on the bottom surface of the lower housing 30. Ribs 70 and 72 are formed on opposite sides of the slot 34 on the bottom surface of the lower housing 30. Ribs 70' and 72' are formed on opposite sides of the slot 34 on the bottom surface of the lower housing 30. Rib 70 has hole 74 and rib 72 has hole 76. Rib 70' has hole 74' and rib 72' has hole 76'. Two bosses 205 are located on the lower housing.

A spring 50, especially a thin plate type spring, is coupled at one end to rib 70 and coupled at the other end to rib 72. Spring 50' has the same structure with respect to ribs 70' and 72'. The spring 50 may be divided into 3 parts, which are coupling parts 58, 60, plane parts (or flat portions) 54, 56 and a bending part 52. The coupling part 58 is coupled to the rib 70, then a projection 62 of the coupling part 58 is inserted into the hole 74 of the rib 70, then the rib 70 and the spring 50 is securely coupled. The same coupling structure and the coupling manner is applied to the rib 72 and the coupling part 60. The plane (flat) parts 54, 56 are parallel with a longitudinal direction of the slot 34. Spring 50' has the same type of relationship with ribs 70', 72' and slot 34'. To use this kind of spring, the assembly is easily performed without screws.

An access door 40 is provided from the outer surface of the lower housing 30. The access door has a pair of pins 42 and 42' which have ring-shaped grooves 44 and 44' respectively. At the ring-shaped groove 44, a washer 46 is coupled, which includes a circular type projection 48. At the ring-shaped groove 44', a washer 46' is coupled, which includes a circular type projection 48'. The washer 46 coupling the pin 42 and the washer 46' coupling the pin 42' hold the access door 40 at the bottom surface of the lower housing 30, which enables the access door 40 to be moved horizontally along slots 34 and 34'. A projection 48 has a smaller diameter than that of the washer 46. Therefore, the projection 48 decreases the friction between the bottom surface of the lower housing 30 and the washer 46 by the reducing the connecting surface when the access door 40 is moved horizontally along the slot 34.

Figure 3:
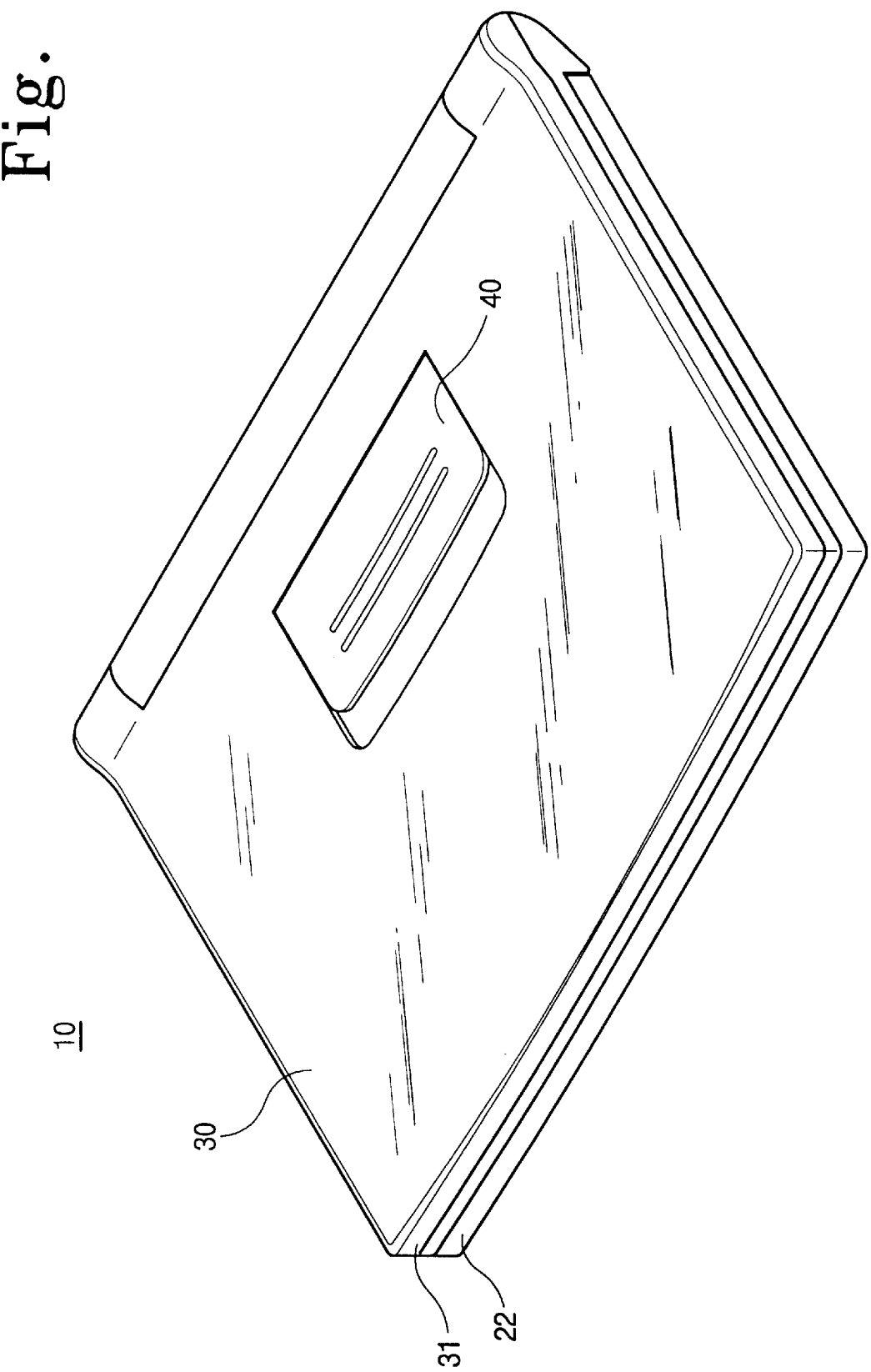
FIG. 3 is a perspective view for illustrating the lower housing coupled to the access door looking toward a bottom of the lower housing.

Referring to FIG. 3, the access door is coupled to the lower housing 30 from outside of the lower housing 30. In this state, the pin 42 is passed through the slot 34 and coupled to the washer 46. When the access door 40 is completely mounted at the lower housing 30, the pin 42 is connected with the spring 50. As mentioned above, the spring 50 has plane parts 54, 56 and the bending part 52. For example, when the pin 42 is moved from the plane part 56 towards plane part 54, but not past bending part 52 (referring to FIG. 2), then the door is always closed by the pushing force of the spring 50. When the location of the pin 42 is beyond the bending part 52 and on plane part 54 (referring to FIG. 4), then the door is always open. Therefore, the spring 50 force keeps the door 40 completely open or closed depending on what side of the bending portion 52 the pin 42 is on.

Figure 4:
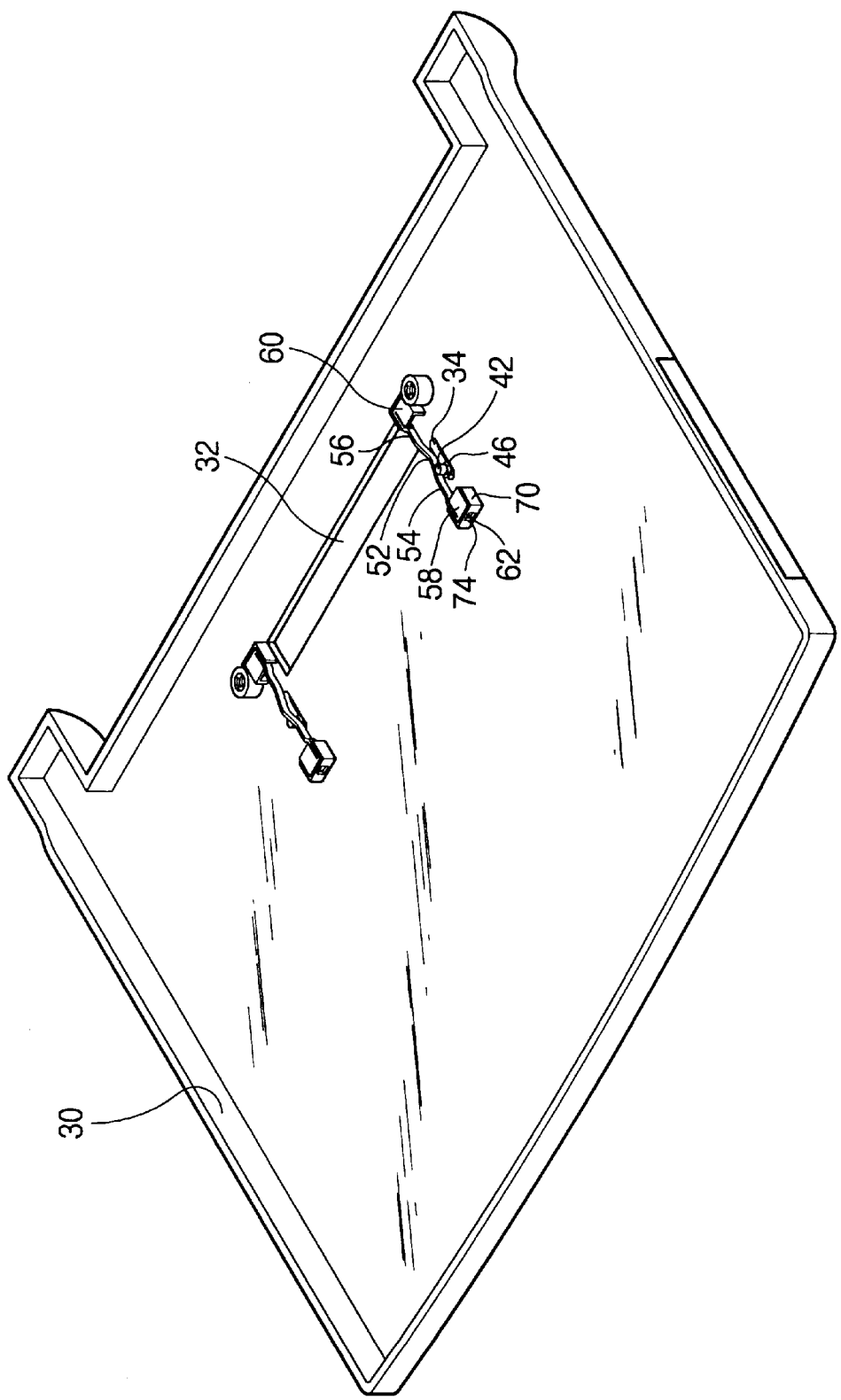
FIG. 4 is a perspective view for illustrating opening of the door attached to the portable computer in FIG. 2.
Figure 4A:
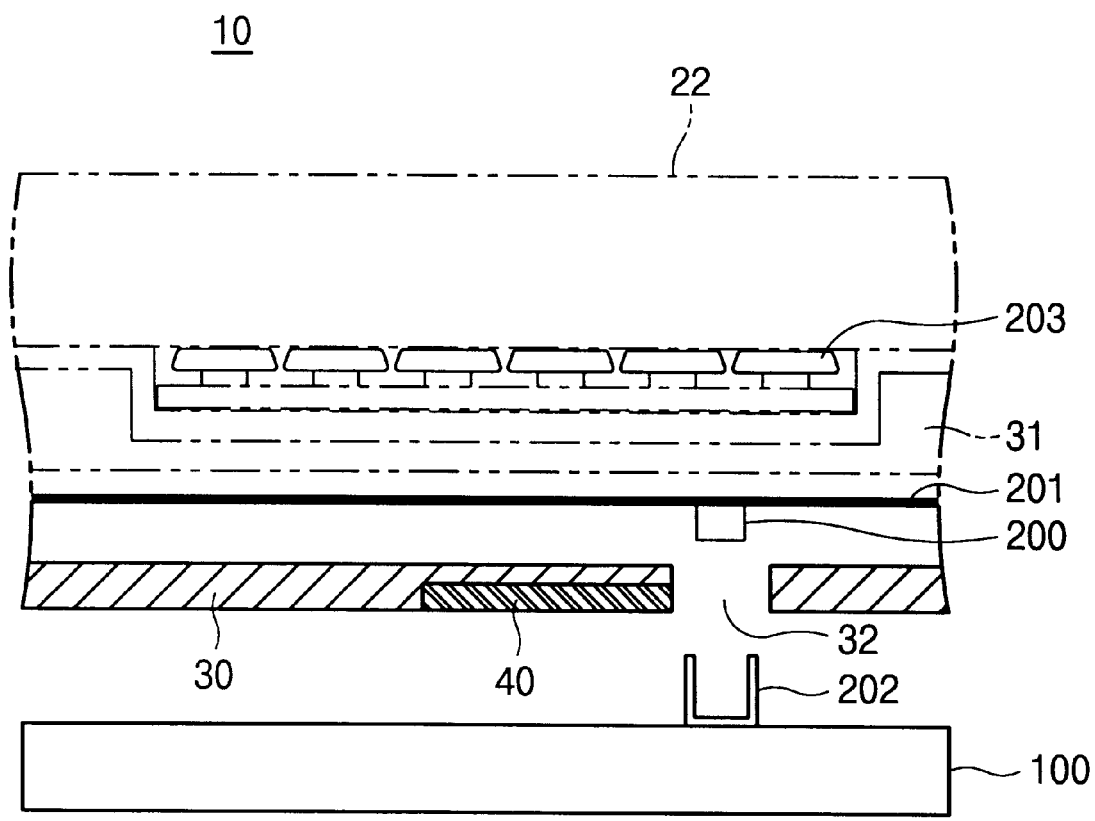
FIG. 4a is a cross-sectional view taken along a line 4a—4a in FIG. 2 when the portable computer is about to dock.
Figure 5:
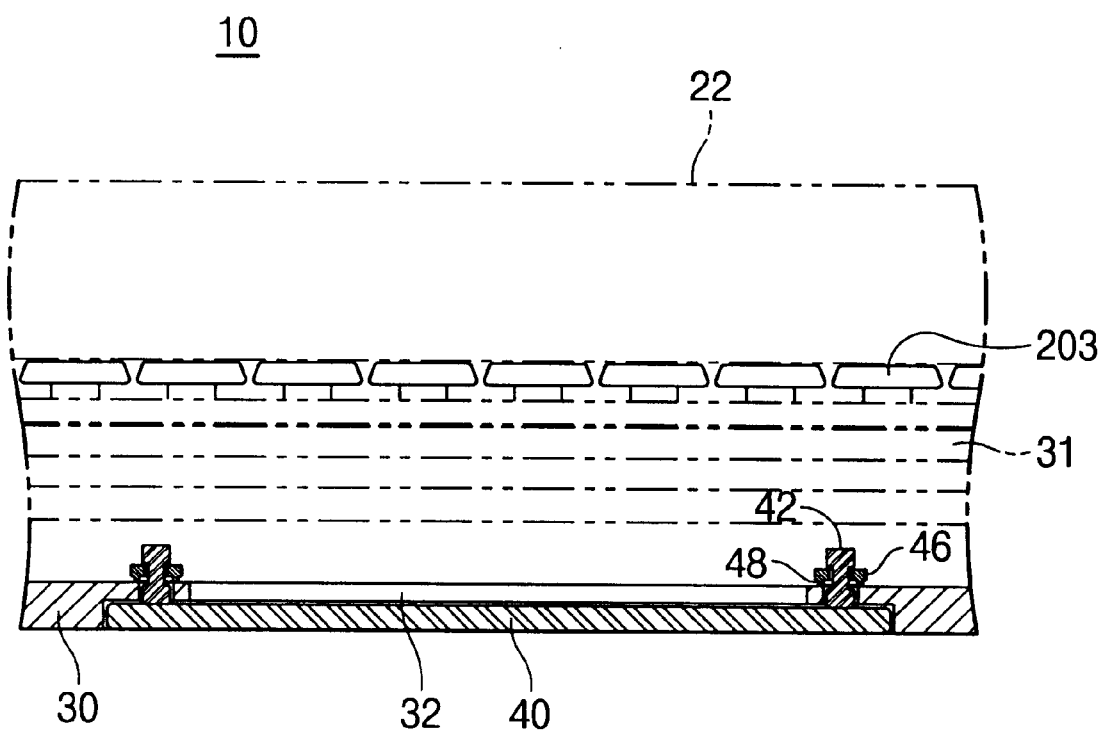
FIG. 5 is a cross-sectional view taken along a line 5—5 in FIG. 2.
Figure 6:
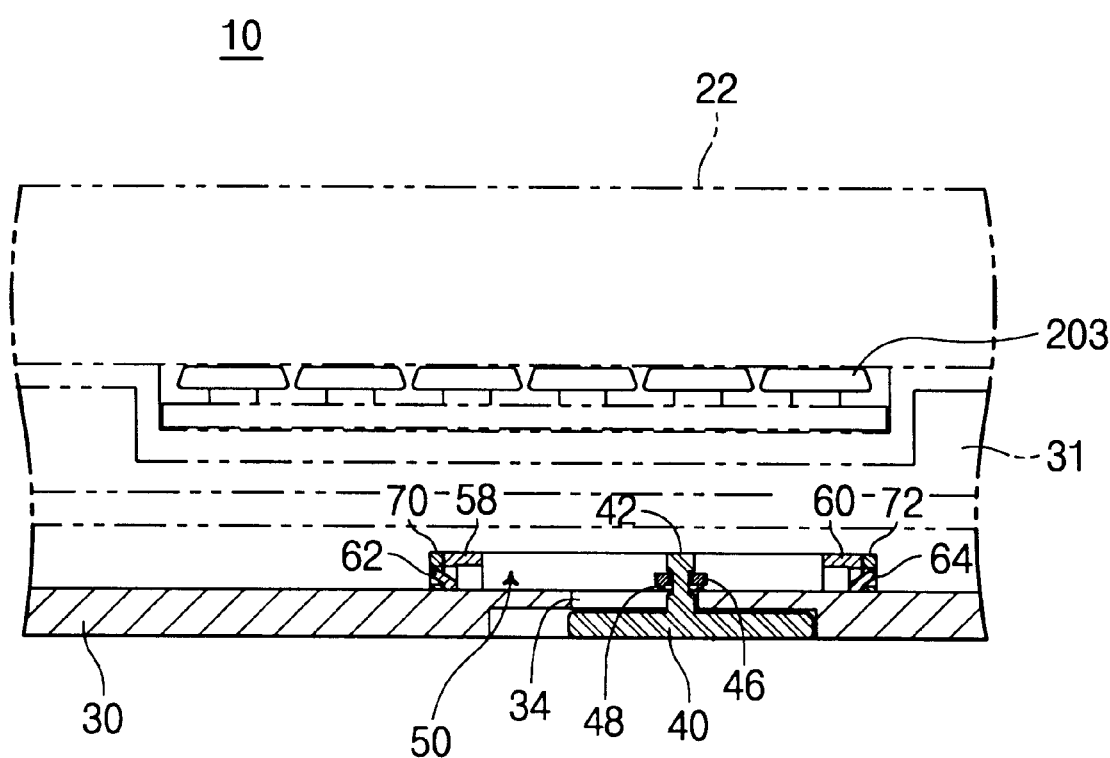
FIG. 6 is a cross-sectional view taken along a line 6—6 in FIG. 2.

Referring to FIG. 4a, a first connector 200 is provided with the portable computer to be coupled to a second connector 202 from a docking station 100 above the opening 32. The first connector is attached to a circuit board 201.

Figure 7:
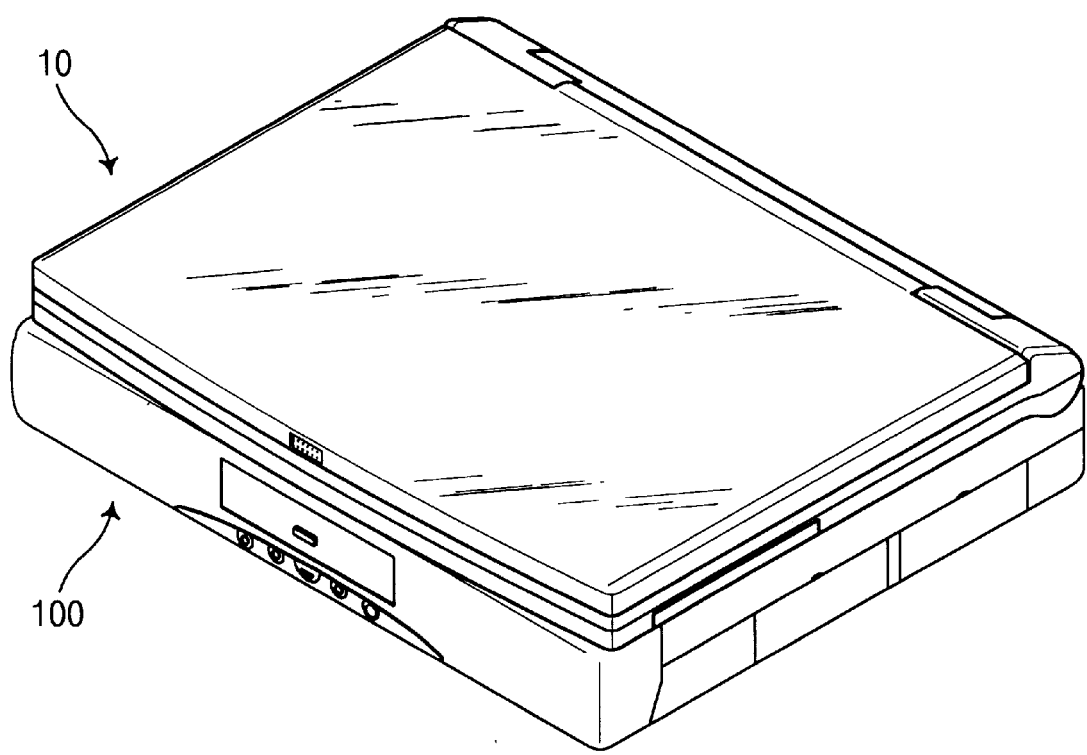
FIG. 7 is a perspective view for illustrating the attachment of the portable computer to a docking station.

Referring to FIG. 7, the docking station structure is used to operatively connect the portable computer to desktop computer peripheral devices. The docking station has an internal receiving chamber into which the portable computer may be manually inserted.

The portable computer 10 according to the present invention is easily connected with the docking station 100 by using the access door 40. At first the access door 40 is opened, then the connector of the portable computer is coupled to the docking station. In this way, the coupling is performed by simply loading the portable computer on the docking station.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A portable computer, comprising:
   a lower portion of a housing having an aperture allowing a coupling with a docking station, said lower portion including at least one slot, said housing accommodating electronic components for performing functions of said portable computer;
   two ribs, each one on an opposite side of the slot;
   at least one resilient member having a plate with a coupling formed at both ends of said plate, said plate having a first plane portion and second plane portion on opposite sides with a bent portion between said first and second plane portions, each one of said couplings bracketed by each one of said ribs, said plane portions being parallel with a longitudinal direction of the slot;
   a panel disposed on a bottom side of said lower portion;
   at least one pin with a ring shaped groove forming on said panel, said pin projecting through the slot and touching said resilient member, the slot allowing said panel to slide along the longitudinal direction of the slot, said bent portion of said resilient member forcing said pin along with said panel to move towards one of said plane portions depending on which side of said bent portion said pin is on, the force of said resilient member allowing said panel to completely cover the aperture;
   a washer coupled to said pin at the ring shaped groove;
   an upper portion of said housing coupling said lower portion, said upper portion accommodating an input device and a pointing device for said portable computer; and
   a cover pivotally attaching to said top portion, said cover incorporating a display screen providing variable video display.

2. The portable computer of claim 1, wherein said lower portion has two slots with one on each side of the aperture, said slots being parallel in a longitudinal direction.

3. The portable computer of claim 1, further comprising:
   a circuit board coupling to said lower portion, said circuit board accommodating a microprocessor controlling functions of said portable computer; and
   a connector attaching to said circuit board and being disposed above the aperture in said lower portion, said connector coupling with the docking station, thereby allowing said portable computer to share the memory and electrical power of the docking station.

4. The portable computer of claim 1, wherein said washer has a circular projection having a diameter less than a diameter of said washer, thereby reducing the friction between a bottom surface of said lower portion and said washer when said panel is moved horizontally along the slot.

5. The portable computer of claim 1, wherein said two ribs each have three connected walls formed with an opening at a top portion and an opening on a side facing other said rib, the opening at the top portion allowing for installation of said resilient member within the two ribs, said two ribs each having a hole in one wall.

6. The portable computer of claim 2, wherein two said resilient members are disposed on opposite sides of the aperture with each one bracketed by a pair of ribs.

7. The portable computer of claim 3, wherein said panel has two said pins, each one with a ring shaped groove and projecting through one of the slots and allowing said panel to slide along the longitudinal direction of the two slots.

8. The portable computer of claim 7, wherein each one of said two couplings of said resilient member has a projection, said projection is inserted into the hole of said rib.

9. A method, comprising the steps of:
   perforating with an aperture a bottom side of a lower portion of a housing for a portable computer, the aperture allowing said portable computer to couple with a docking station, said housing accommodating electronic components for performing functions of said portable computer;
   perforating said lower portion with at least one slot;
   forming two ribs with each one on opposite sides of the slot;
   inserting at least one resilient member between said two ribs, said resilient member having a plate with a pair of couplings formed at each end of said plate, said plate having a first plane portion and a second plane portion on opposite sides with a bent portion between said first and second plane portions, each one of said couplings bracketed by each one of said ribs, said plane portions being parallel with a longitudinal direction of the slot;

inserting a pin formed on a panel through the slot from outside a bottom side of said lower portion and touching a surface of said resilient member, said bent portion of said resilient member forcing said pin along with said panel to move towards one of said plane portions depending on which side of said bent portion said pin is on, the force of said resilient member allowing said panel to completely cover the aperture the aperture;

forming a ring shaped groove on said pin;

attaching a washer to said pin at the ring shaped groove, said washer holding said panel in place;

coupling an upper portion of said housing with said lower portion, said upper portion accommodating an input device and a pointing device for said portable computer; and pivotally attaching a cover to said upper portion, said cover incorporating a display screen providing variable video display.

10. The method of claim 9, wherein said lower portion has two slots with one on each side of the aperture, said slots being parallel in a longitudinal direction.

11. The method of claim 9, further comprising the steps of:

coupling a circuit board to said lower portion, said circuit board accommodating a microprocessor controlling functions of said portable computer;

attaching a connector to said circuit board and being disposed above the aperture in the lower portion; and coupling said connector with the docking station, thereby allowing said portable computer to share the memory and electrical power of the docking station.

12. The method of claim 9, wherein said washer has a circular projection having a diameter less than a diameter of said washer, thereby reducing the friction between a bottom surface of said lower portion and said washer when said panel is moved horizontally along the slot.

13. The method of claim 9, wherein said two ribs each have three connected walls formed with an opening at a top portion and an opening on a side facing other said rib, the opening at the top portion allowing for installation of said resilient member within the two ribs, said two ribs each having a hole in one wall.

14. The method of claim 10, wherein two said resilient members are disposed on opposite sides of the aperture with each one bracketed by a pair of ribs.

15. The method of claim 14, wherein said panel has two said pins, each one with a ring shaped groove and projecting through one of the slots and allowing said panel to slide along the longitudinal direction of the two slots.

16. The method of claim 13, wherein each one of said two couplings of said resilient member has a projection, said projection is inserted into the hole of said rib.

* * * * *